June 20, 1961 J. HUNTER 2,989,595

SUPERIMPOSED RECORDING

Filed July 5, 1955 7 Sheets-Sheet 1

INVENTOR

Jonathan Hunter

June 20, 1961 J. HUNTER 2,989,595

SUPERIMPOSED RECORDING

Filed July 5, 1955 7 Sheets-Sheet 2

INVENTOR

Jonathan Hunter

June 20, 1961

J. HUNTER 2,989,595

SUPERIMPOSED RECORDING

Filed July 5, 1955

7 Sheets-Sheet 3

INVENTOR
Jonathan Hunter

June 20, 1961 J. HUNTER 2,989,595

SUPERIMPOSED RECORDING

Filed July 5, 1955 7 Sheets-Sheet 4

INVENTOR

Jonathan Hunter

June 20, 1961 J. HUNTER 2,989,595

SUPERIMPOSED RECORDING

Filed July 5, 1955 7 Sheets-Sheet 5

INVENTOR
Jonathan Hunter

June 20, 1961 J. HUNTER 2,989,595

SUPERIMPOSED RECORDING

Filed July 5, 1955 7 Sheets-Sheet 6

INVENTOR

BY Jonathan Hunter

June 20, 1961 J. HUNTER 2,989,595

SUPERIMPOSED RECORDING

Filed July 5, 1955 7 Sheets-Sheet 7

INVENTOR

Jonathan Hunter

United States Patent Office 2,989,595

Patented June 20, 1961

2,989,595

SUPERIMPOSED RECORDING

Jonathan Hunter, Lafayette, Calif., assignor to Marchant Research, Inc., a corporation of California Filed July 5, 1955, Ser. No. 519,778
12 Claims. (Cl. 179—100.2)

The present invention relates to magnetic recording devices and more particularly concerns means for recording a multiple of signals, or channels, on a single track of magnetic tape, or other magnetic medium.

The most common type of magnetic recording comprises the recording of a single channel on a single track. This method of recording possesses the following disadvantages: (1) because information is recorded serially from one end of the magnetic tape to the other, access to a particular information area can be obtained only by moving the magnetic medium long distances; (2) if it is desired to simultaneously record two separate pieces of information in parallel and then synchronize these two pieces into a single recording or play-back, difficulty is encountered in obtaining optimum synchronization; (3) considerable storage and operating space is required for single channel-single track recordings.

One type of magnetic recording which overcomes some of the disadvantages of the single channel-single track type is that in which a plurality of recordings are made in parallel channels on a single tape. In so doing, however, other disadvantages arise: (1) a greater width of tape is required which in turn, requires more operating and storage space for the record; and (2) the greater width of tape also requires a particular size of reel which varies with the number of tracks recorded.

The present invention overcomes these difficulties by providing novel means which permit a plurality of channels to be superimposed upon each other on a single track. Such recording is made possible by providing a plurality of recording heads for recording on the same track and which heads have gaps which are set at discrete angles with respect to each other. Alternatively, a single head, adjustable to different discrete angles, may be provided for recording a plurality of channels on a single track. It has been found that any one channel may be played back through the use of a reading head set at an angle which matches that used during recording and that the playback is accomplished with negligible interference from the other recordings. Furthermore, by the use of two or more heads, a plurality of recordings may be played back simultaneously and in synchronism without the use of an extra synchronizing track.

It has been found that by recording the first channel at a level below saturation, and recording successive channels at the same or progressively lower levels, the successively recorded channels do not cancel out the previous channels at the point of intersection of the signals. Furthermore, cross-talk between channels is reduced to an insignificant level and since the point of intersection of the signals is insignificant compared with the remainder of any one signal, interference between channels is negligible, Other advantages of packing a plurality of channels on a single track are as follows: it permits the use of an ordinary size of reel, head, and tape, none of which need to be different for recording a variable number of channels; because the number of channels recorded is not dependent on the tape width, the associated apparatus can be small, although the information capacity is as least as much as the wider parallel track type; and the space needed for operating and storing the record is very much reduced over any of the prior types of recording; recording may be either serial or parallel; if serial, the effective length of the tape is increased greatly without increase in access time; if parallel, all the information is packed onto a tape that is the same size as that previously used for serial recording in a single channel.

It is therefore a primary object of the present invention to provide an improved apparatus and method of magnetic recording.

It is a further object to record a plurality of channels on a single track of magnetic medium.

It is a still further object to reduce the length of tape required in serial recording.

It is an additional object to permit parallel recording on tape of conventional width, the width being independent of the number of channels recorded.

Another object is to reduce the cost of magnetic recording.

Still another object is to reduce the operating and storage space necessary for magnetic recording.

Other objects of the invention will become apparent from the following description of the invention in which.

Figure 2:
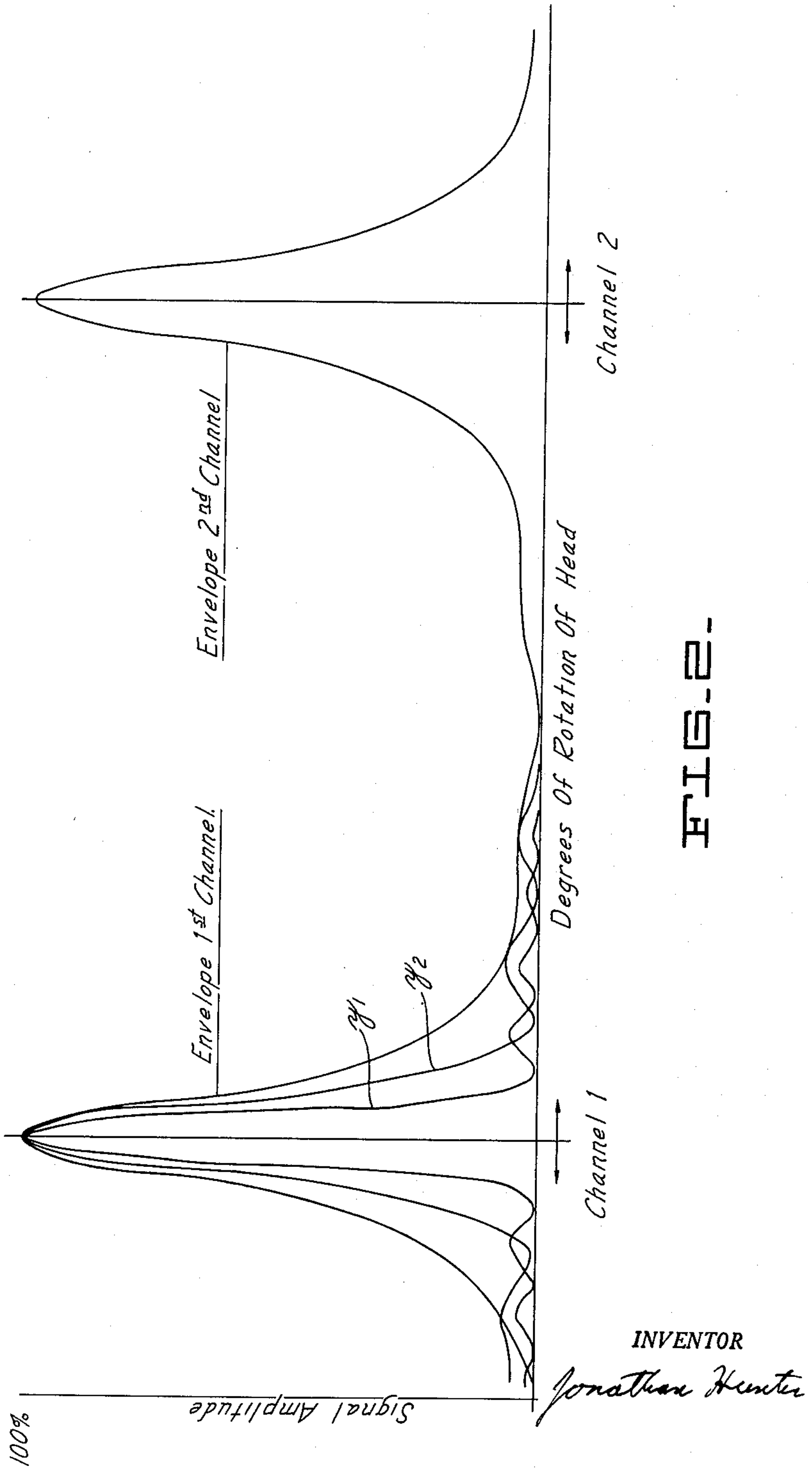

FIG. 2 schematically illustrates the shape of the response curves resulting from rotating a playback head to discrete angles in either direction from a reference recording position.

Figure 3A:
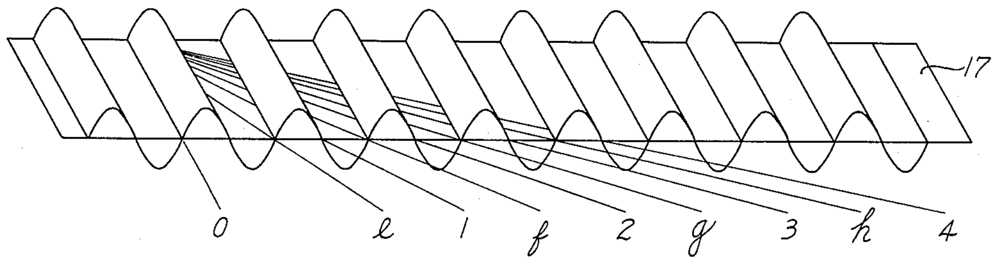

FIG. 3A is a space plot of magnetization intensity along a magnetized tape in relation to selected angular positions of a playback head.

Figure 3B:
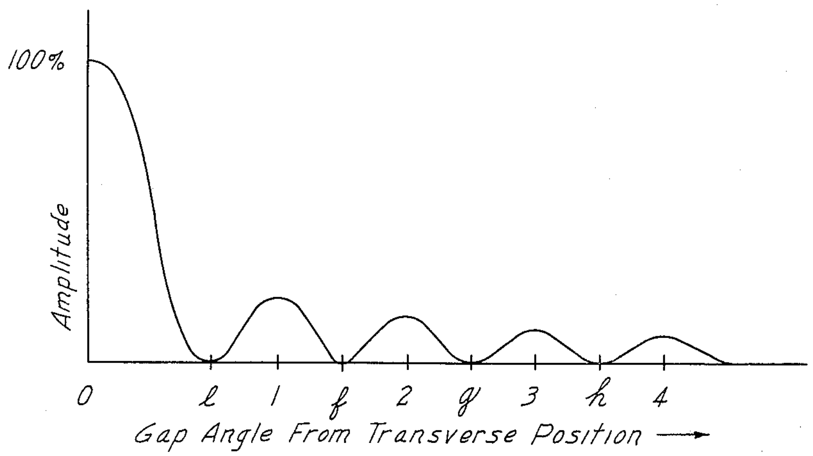

FIG. 3B correlates the amplitude variations in a response curve with the position of a playback head and the space plot of tape magnetization intensity.

Figures 4A, 4B, 5:
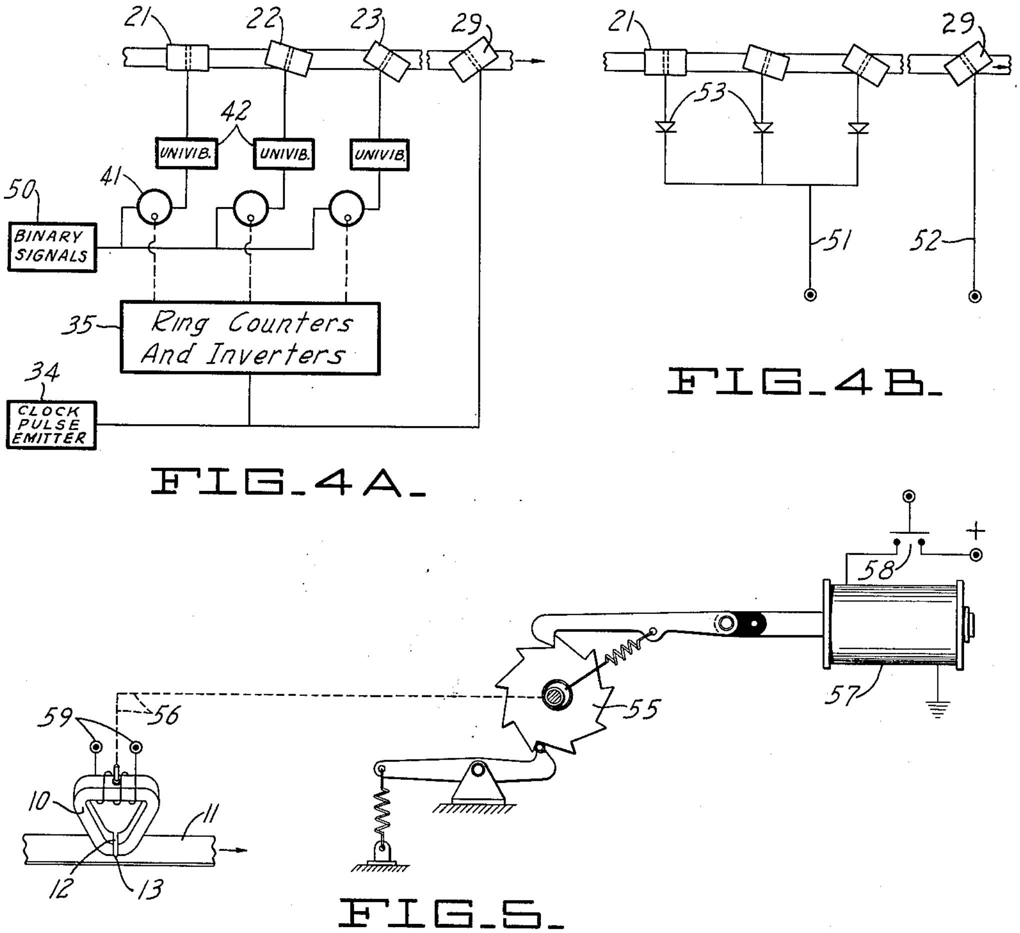

FIGS. 4A and 4B are block diagrams of a first embodiment of the present invention showing the invention as applied to digital recording.

FIG. 5 is a schematic illustration of a second embodiment of the invention.

Figure 6:
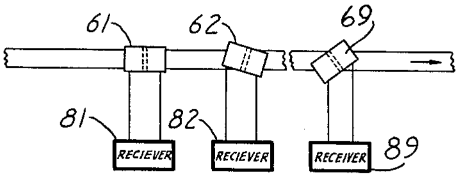

FIG. 6 is a schematic illustration of a third embodiment as applied to a monitoring system.

Figure 7:
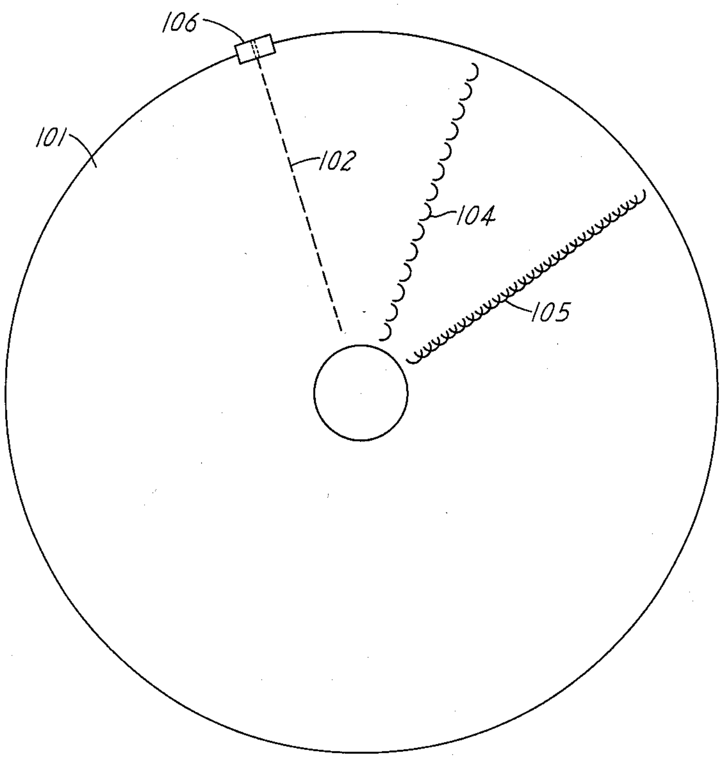

FIG. 7 schematically illustrates a fourth embodiment of the invention in connection with a magnetic disc.

Figure 8:
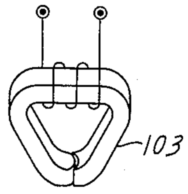

FIG. 8 is a projection of a recording head.

Figure 9:
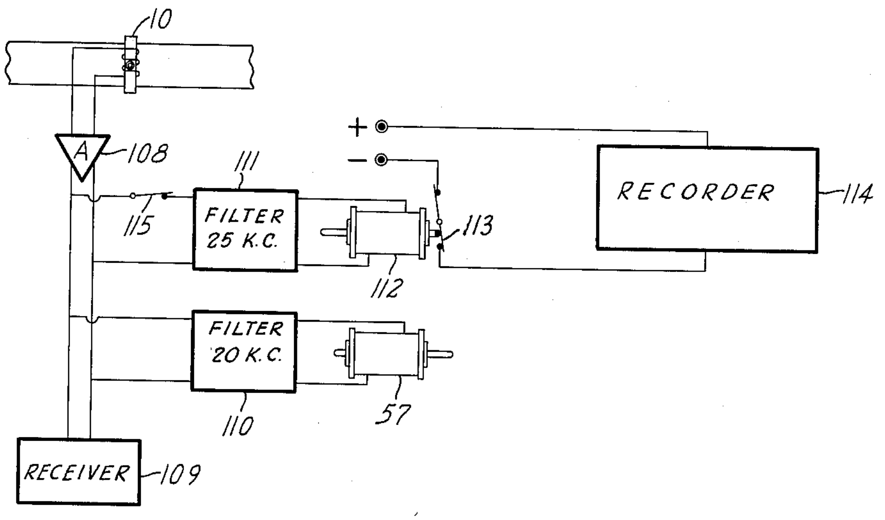
Figure 10:
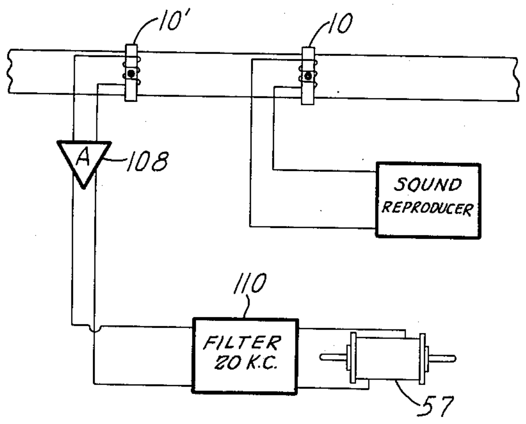

FIGS. 9 and 10 schematically illustrate a fifth embodiment of the invention.

Figure 11:
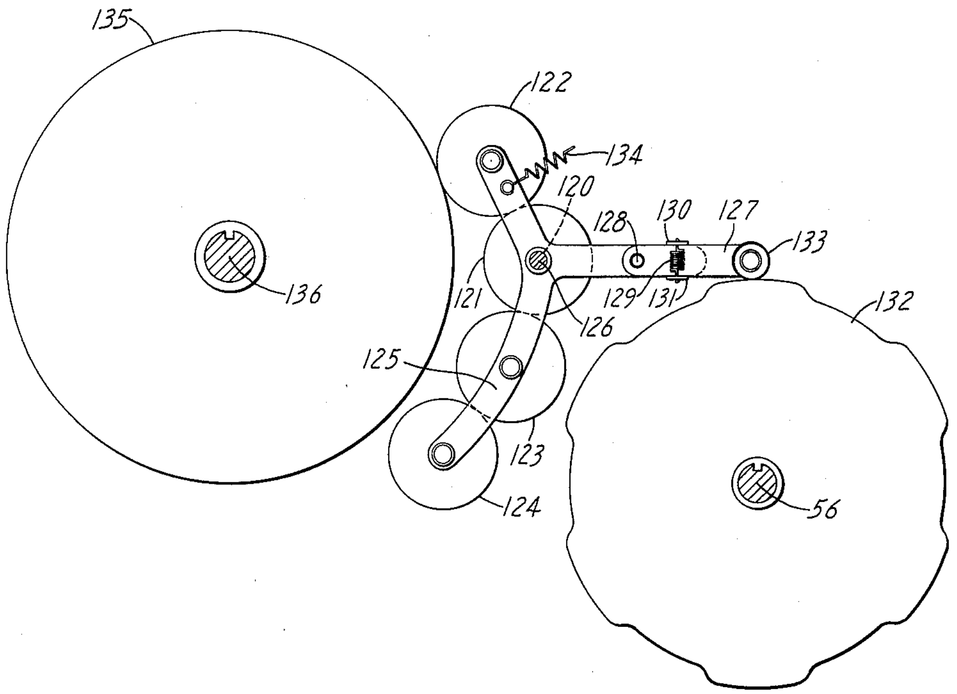

FIG. 11 illustrates a reversible drive for the tape transport mechanism.

To illustrate the recording and playback of multiple channels on a single tape track, reference is made to a single recording head 10 such as shown in FIG. 5 having a core gap 12, and pole face 13. The head may be adjusted to different discrete angles relative to the tape 11 in which positions the head is enabled to record information in correspondingly different channels on the tape. To reproduce the information, the head is set at the recording angle corresponding to the channel containing the information desired. It has been found that in recording digital values for use in computers, a difference of a little as 9° in head position permits reproduction of the particular information on one channel to the substantial exclusion of all other information on the track.

Figure 1A:
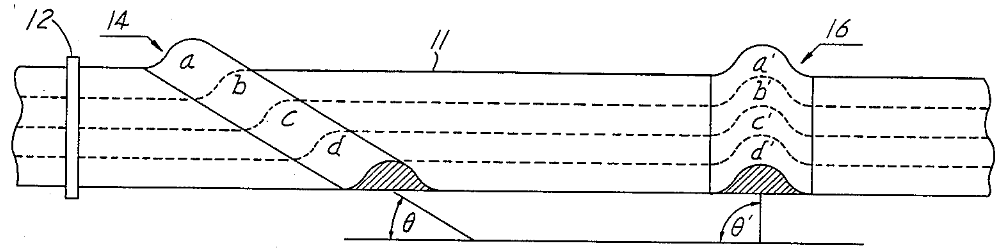
FIG. 1A is a diagrammatic representation of magnetized tape.
Figure 1B:
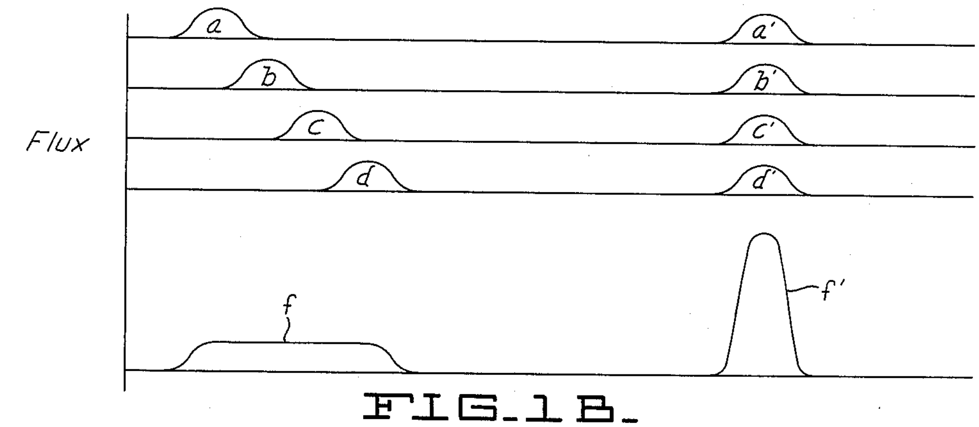
FIG. 1B is a representation of the magnetization of the tape shown in FIG. 1A.
Figure 1C:
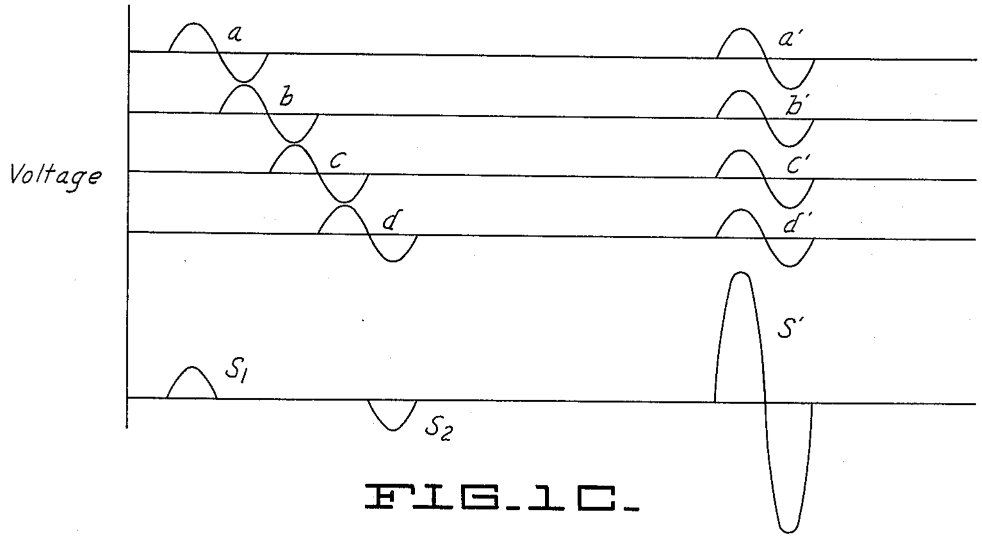
FIG. 1C is a representation of the voltage developed as a result of the magnetization shown in FIG. 1B.

Selected information is reproduced with only negligible interference as is shown by reference to FIGS. 1A, 1B, 1C. A first signal represented as 14, FIG. 1A, is recorded on a tape 11 at an angle $\theta$ with the tape. A second signal represented as 16 is recorded at an angle $\theta'$ with the tape. For purpose of illustration, each signal may be divided into four magnetized segments $a$, $b$, $c$, $d$, and $a'$, $b'$, $c'$, $d'$, respectively. These segments may be thought of as quantities of flux which are represented in FIG. 1B by corresponding reference letters. As the tape 11 (FIG. 1A) moves to the left, the flux segment "*a*" first moves underneath the gap 12 and then the flux segment "*b*" moves underneath the gap, etc. It will be noted that there are points in the progression of the tape where portions of two adjoining segments *a*, *b*, for example, will both be under the gap at the same time. Similarly portions of *b*, *c* and *c*, *d* will be under the gap at the same time. Therefore, the flux presented to the gap at any one time comprises at least one and possibly two portions of the segments. The sum of the flux from which the signal is derived, is represented as *f* and *f'* in FIG. 1B. The voltage induced into the transducer from each signal is represented in FIG. 1C; fluxes *a*, *b*, *c*, *d*, and *a'*, *b'*, *c'*, *d'* (FIG. 1C), are differentials of *a*, *b*, *c*, *d*, and *a'*, *b'*, *c'*, *d'* (FIG. 1B), respectively. If these differentials are added in a vertical column, all of the voltages of *a*, *b*, *c*, *d*, cancel each other except $S_1$, the leading portion of segment 2, and $S_2$, the trailing portion of segment *d*; however, the voltages of the signal 16 comprising segments *a'*, *b'*, *c'*, *d'*, add together to make a large signal S'. The same result may be obtained by simply differentiating *f*, FIG. 1B, to get $S_1$ and $S_2$, FIG. 1C, and similarly differentiating *f'*, FIG. 1B, to get S', FIG. 1C.

From the above analysis, it can be seen that a plurality of signals may be superimposed on tape by setting the transducer air gap at various selected angles with respect to the tape and that any respective signal can be reproduced to the substantial exclusion of the other signals.

In the illustration described above, the tape was divided into only four segments and, therefore, the relationship of the distortion produced at $S_1$ and $S_2$ (FIG. 1C) is porportionately larger than is actually the case since each magnetized portion 14 is comprised of thousands of segments depending upon the characteristics of the tape used.

The number of channels that can be recorded on a single track depends only on the tape speed and the recording frequencies. The relationship between channel angles, length of the magnetized wave on the tape, and response amplitude is illustrated in FIG. 2. Assume that information has been recorded on a tape by a single recording head which stands in a fixed position designated as channel 1; then with the reproducing transducer held in precisely the same angle as the recording transducer, the response signal amplitude is the greatest, and is arbitrarily designated as 100 percent. As the reproducing transducer is rotated from channel 1 position, the signal response for any one frequency is similar to $y_1$ or $y_2$; and for a given range of frequency $y_1$ to $y_2$, the response forms an envelope as indicated. It is seen that as the head is rotated, the signal falls off to such a degree that it is possible to determine the point at which a second channel may be established. Such a channel, designed as channel 2, causes only negligible interference with respect to channel 1.

To explain the valleys and peaks, shown in FIG. 2, reference is made to FIGS. 3A and 3B. FIG. 3A represents a variation of magnetization on a magnetic tape. The magnetization is caused by an alternating flux across the gap of recording transducer as the tape moves past the gap with the pole faces of the gap being parallel to line 0. FIG. 3A is merely a representation of the direction and magnitude of magnetization of the magnetizable film on the tape to enable a visualization of the phenomenon. Reference plane 17 may be thought of as the magnetizable film. Lines 0 to 4 and lines *e* to *h* are drawn at angles which simulate different angles of the heads, and such position of the heads would produce respective signals corresponding to the peaks and valleys shown in FIG. 3B, which peaks and valleys are a function of the recorded wave length.

A playback head is rotated through the angles 0 to 4 and the resulting response curve shown in FIG. 3B is plotted as a function of the head rotation. The lines 0, 1, 2, 3, 4 and *e*, *f*, *g*, *h* should be imagined as vertical cuts through the waves, the cuts being perpendicular to plane 17. The resulting sections are representative of the magnitude and direction of the magnetization at any point along the corresponding lines, and this representation of magnetization is presented to the gap of a playback head if it is placed at the angle of the section. Lines 0, 1, 2, 3, 4 (FIG. 3A) are representative of the position of the playback head when the valleys (FIG. 3B) are produced. The response at 0 is 100 percent, since this is the recording position. As the playback head is rotated to line *e*, the response curve decreases from a maximum value to zero. The reason for the decrease in response is illustrated in FIG. 3A. In discussing FIG. 3A, it should be remembered that to produce a response voltage in the playback head, a changing flux is necessary. By looking along line *e* (FIG. 3A) it can be seen that the flux is changing in two directions and that the changes in each direction are equal. The voltages resulting from these opposite changes are of opposite polarity and therefore cancel, causing the valley *e* (FIG. 3B). As the playback head is rotated further, the response increases to a smaller peak 1. Again, to clarify the explanation, reference is made to FIG. 3A; by following along line 1, it will be observed that there is a net change in one direction, the peak response at 1. As the playback head is further rotated, valleys and peaks of diminishing value are produced, the peaks diminishing because the peak net flux decreases as the angle increases.

When recording only one frequency in each of the separate channels, it can be seen from the above discussion that obvious advantages result by establishing the additional channels at the valleys of the responsive curves.

To record and playback superimposed multiple channels on a single track, any of three types of structures can be used: (1) a single rotatable head to record and to playback information in the various channels; (2) fixed heads to record and to playback information in the respective channels; (3) fixed heads to record and a rotatable head to playback, or a rotatable head to record and fixed heads to playback. The rotatable and fixed transducing heads shown in the embodiments may be of any convenient available type, e.g., the type disclosed in the patent application Serial Number 297,441, filed July 7, 1952, by George B. Greene. The head should be suitably modified for adaptation to the desired tape width. The head mounting also should be modified to allow the head to be rotatable or fixed, which ever is required.

*First embodiment*

The arrangement shown in FIG. 4A, comprises a plurality of recording heads 21–29 set at discrete angles relative to a magnetic tape for parallel recording of information transmitted serially from a computer. The heads 21–29 are fixed in position and therefore each is recording or reproducing in its respective channel, each head being associated with a particular binary order of the computer read-out mechanism.

A source of binary signals is indicated at 50 and a source of clock pulses is indicated at 34. The binary signal source, for example, may be the same as the 1's transfer bus shown in FIG. 32 of the patent application Serial Number 458,473, filed September 27, 1954, in which a pulse represents a binary value of "1" and the absence of a pulse represents a "0." The clock pulse source 34 is indicated by the reference number 120 in FIG. 35 of the above-mentioned application.

The ring counter of FIG. 4A may be any one of several types. One type is that disclosed in the Patent Number 2,542,644, issued February 20, 1951, to J. O. Edson. The inverter may be an ordinary type of normally conducting triode. The gates 41 may be any convenient type; e.g.; the one pictured on page 37 in High Speed Computing Devices by the staff of Engineering Research Associates, Inc., and published by McGraw-Hill Book Co., Inc. Univibrators 42 may be the same as that shown in FIGS. 22 and 23 of the previously mentioned patent application.

At the beginning of a word input, an indexing pulse source 34 (FIG. 4A) sets the ring counter 35 to the position corresponding to the first order, thereby arming the first order gate 41. Then the first order input pulse, assume a "1," from the source 50, triggers the gate 41 causing the pulse to trigger the univibrator 42. The latter, in turn, causes the head 21 to record the signal in a particular channel defined by the angle at which the head 21 is fixed.

The univibrator is used to lengthen the signal transmitted from the pulse source 50. Such signals may occur in the order of 300 kc. per second which determines a signal wave of such short duration that the head may be incapable of resolving the signal. Therefore, the univibrators are employed to lengthen the respective signals within the resolving range of the heads.

The next clock signal sets the ring counter to the second order position, thereby arming the second order gate 42 allowing the second order input pulse to trigger the gate and the univibrator, thus recording the second signal in the second channel. If the input is a "0" the gate will not be triggered, and a "0" will be recorded by the absence of a signal on the tape. The second order channel is defined by the angle at which the head 42 is mounted. The subsequent input pulses are likewise guided to the proper heads until the complete word is printed whereupon the ring counter returns to a position to allow the input of the next word. A separate channel defined by the angle of head 29 is used to record the indexing pulses.

The speed of the tape should be fast enough to advance one binary digit interval for each word recorded; e.g., the first pulse of the first word recorded by any respective head should not overlap the first pulse of the second word recorded by that same head; however, portions of the respective signals on the tape will be superimposed upon each other. The tape speed is not critical when it is greater than one digital advance per word, although a speed very much faster is wasteful of tape.

To reproduce the recorded information, using the structure of FIG. 4B, the tape can be operated at any convenient speed. Only one head is operating at any instant so that all the word pulses may be conducted to one output lead 51, the indexing pulses having a separate output at lead 52. The diodes 53 prevent interaction between the head that is operating and the other order heads and channels. The output lead 51 may be connected to any desired form of discriminating mechanism such as an input control device for the registering mechanism of a computer or the like, and the indexing pulse lead 52 (FIG. 4B) may be suitably connected in well-known manner to trigger such an input control device.

The structure in this embodiment allows the parallel recording and reproducing of a serial form of digital information and entirely fills all of the channels thereby permitting rapid recording with a reduced amount of tape. Reproduction may be accomplished at any convenient speed.

*Second embodiment*

The structure of the second embodiment (FIG. 5) may be used either for recording or playback. One use would be a playback of audio recordings allowing a selection of programs in the various channels or of one long program progressing from one channel to the next.

The head 10 and ratchet gear 55 are rigidly mounted on a common shaft schematically designated at 56. The ratchet is rotated by pulsing the solenoid 57 through closure of switch 58 thereby causing the transducing head to be rotated to any desired channel. Information can be fed into the head through leads 59 and recorded in the particular channel, defined by the position of the ratchet, and therefore, the position of the head. To playback a recording, the ratchet is turned by pulsing the solenoid until the head is rotated to the angle defining the channel which contains the desired information, obtaining the output at leads 59.

*Third embodiment*

FIG. 6 shows a monitoring system illustrating a possible use of fixed heads each recording in its particular channel on the tape. Rigidly mounted heads 61–69 are useful in any type of magnetic recording wherein it is desirable to record in parallel. All of the receivers 81–89 receive information simultaneously and all of the corresponding heads record their particular information simultaneously in the various channels which are defined by the respective angle of each head to the tape. During playback of the monitored information, a rotatable head such as that shown in FIG. 5 may be used to select the particular information desired.

*Fourth embodiment*

A disc 101 (FIG. 7) of magnetic recording medium is provided, and cooperating with the disc is a magnetic head 106 which is moved radially of the disc during the recording process to produce a spiral of magnetic signals upon the disc. These signals are schematically indicated at 102 in FIG. 7 to show only a plurality of the positions of the head in a radial line, the remainder of the spiral pattern being omitted. The means for moving the head radially are conventional. For example, the Patent Number 1,940,274 shows one form of such moving means. The speed of radial movement of the head and of the disc is determined so that there is no overlap of signals 102.

According to the present invention, a head 103 (FIG. 8) is provided, having its core gap in the form of a curve and which head, when guided for radial movement at the same speed as the conventional head produces the signal pattern 104 (FIG. 7). Now, by maintaining the speed of rotation of disc 101 constant and reducing the speed of radial movement of the head 103, a signal pattern such as indicated at 105 is produced in which portions of the signals are superimposed upon each other. The angle described by the intersecting signals is sufficient to reduce interference to a minimum while permitting at least twice the number of signals to be packed upon the disc. Variations in the configuration of the core gap will occur to those skilled in the art, and the configuration shown is understood to be not limiting.

*Fifth embodiment*

This embodiment discloses structure for recording a plurality of superimposed channels of recording on the same tape or similar medium and discloses a control means for switching from one superimposed channel to the next.

A signal recorded at each end of the medium actuates mechanism to reverse the direction of tape motion and simultaneously angularly reorient the transducer.

FIG. 9 schematically illustrates a mechanism for automatically reversing the tape and for rotating the head one increment for each such reversal. A single rotatable head 10 is provided which transmits a signal through amplifier 108 to a receiver 109. The signal is also transmitted through two respective filters 110 and 111 to a pair of solenoids 57 and 112. Solenoid 57 operates mechanism shown and described in connection with FIG. 5. Filter 110 passes a signal above the audio range, for example in the order of 20 kc., and filter 111 passes only signals in the order of 25 kc.

It will be observed that when automatic reversing means are employed, the number of discrete head positions must be an even number so that when the head makes a complete revolution, and returns to its initial position, the tape then will be running past the head in the same direction as it previously did on the first pass of the tape by the head.

Obviously, if an even number of head positions are provided, then recordings can be made on the tape only during the first 180° of rotation of the head; however, the head may be rotated through a full 360° during playback with the second 180° repeating the play-back of the first 180°. Furthermore, it should be noted that the head must be stepped through an even number of positions during each 180° of rotation of the head, so the tape will be passing under the recording head in the same direction for each respective head position in both 180° phases of operation. For this reason, the discrete number of positions of the head may be any multiple of four within the capacity of the head to resolve the separate signals. In the present example, the head is rotated to twelve discrete positions, and therefore, it will be assumed that the ratchet 55 (FIG. 5), in this case, has twelve teeth.

Assuming that he head 10 is capable of being rotated to twelve discrete positions, then six signals of 20 kc. are recorded at discrete angles at each end of the tape, one discrete signal for each position of the head. Thus, a single head may be used both for sound reproduction, and for initiating the operation of solenoid 57 to advance the head to its next angular position, and to reverse the direction of the tape movement.

A single 25 kc. signal is recorded at a position on the tape corresponding to the sixth position of the head which signal energizes solenoid 112 and throws a toggle switch 113 to open position, thus opening the circuit of the entire recording unit 114 when the reproduction of six recordings is completed. A separate manually operable switch 115 is provided for disabling the solenoid 112 either when restarting the unit or when continuous and repeated operation of the recording unit is required.

An alternate form of this embodiment is shown in FIG. 10 in which two separate heads 10 and 10' are provided. These heads are stepped in unison from one position to the next in the same manner as described for the single head 10 in FIG. 9. In FIG. 10, the head 10 is used for sound reproduction and head 10' is used solely for operation of solenoid 57. In FIG. 10, the automatic stopping means has been omitted but obviously may be used as disclosed in connection with FIG. 9, or a third head may be provided for such purposes.

The arrangement shown in FIG. 10 permits the heads to be constructed for the optimum response to frequencies desired. Also, in the foregoing description of the embodiment shown in FIG. 10, the head 10 was described as being a reproducing head. It will be apparent, however, that the head 10 may also be used as a recording head if tape is used upon which the proper high frequency signals have been previously recorded on the ends of the tape, and the head 10' is used as a reproducing head. In the present case, only six recordings are possible.

A reversing mechanism for driving the tape in opposite directions is shown in FIG. 11. A shaft 120 is suitably fixed in the framework of the machine and is driven by a motor (not shown). A friction drive wheel 121 is fixed on shaft 120 and drives the idlers 122 and 123 in the same direction. Idler 124 is driven by idler 123 in the opposite direction as idler 122. The idlers 122, 123, and 124 are carried by a three-armed bellcrank 125, freely mounted on a pivot 126 which is coaxial with shaft 120. A follower arm 127 is freely mounted at 128 to the rightmost arm of bellcrank 125 and a spring 129 connected between respective ears 130 and 131 on the follower and the bellcrank normally causes the bellcrank and the follower to act as an integral unit.

A cam 132 is fixed on the previously described shaft 56 (FIG. 5), and is advanced one-twelveth of a revolution each time the tape reaches its end of travel and the solenoid 57 is energized. Such advance of the cam 132 (FIG. 11) alternately moves the high and low peripheries of cam 132 under the follower roller 133. When a low periphery is moved under the roller, a spring 134 rocks the bellcrank 125 in a clockwise direction thus moving wheel 122 out of driving contact with a wheel 135, and moving wheel 124 into contact with the wheel 135. The latter is fixed on a shaft 136 which transmits a reversible drive to a conventional tape transport mechanism.

When the cam 132 is again advanced, the bellcrank 125 is moved back to the position shown against the tension of spring 134, spring 129 being stronger than spring 134. Spring 129, however, may yield temporarily if the cam 132 should cause slight overthrow of the bellcrank 125. With this arrangement, the direction of movement of the tape is automatically reversed every time the solenoid is energized. such reversal also being accompanied by an automatic advance of the recording head 10 (FIG. 5) as previously described.

The subject matter disclosed in connection with the above-described fifth embodiment relating to automatic stopping and reversal mechanism is claimed in a divisional application Serial No. 710,935, filed January 24, 1958, in the name of Clarence W. Martin.

The preceding structures are described as recording only on tape, but it should be obvious that similar structuures such as magnetic drums could be used in other types of magnetic recording in which case it would be necessary to modify the face of the transducer to conform to the curvature of the drum; the invention is equally well applied to a magnetic disc, card, or the like, and in the claims, the term magnetic medium is used to apply to any form of magnetizable material which is capable of recording a signal in response to the operation of a magnetic recording head.

The invention claimed is:

1. A magnetic recorder comprising a movable magnetic medium, a recording head mounted for rotation in a plane parallel to the path of movement of the recording medium, a signal input source for the recording head, means for repeatedly moving the magnetic medium past the recording head, and means for adjusting the head to a plurality of discrete angular positions in each of which it enters a discrete magnetic signal upon the magnetic medium in superimposed relationship to a plurality of discrete signals previously superimposed on each other on the magnetic medium.

2. A magnetic recorder according to claim 1 in which the recording head alternatively acts as a playback head and reproduces a discrete signal from the magnetic medium corresponding to the discrete angular position to which the head is adjusted.

3. A magnetic recorder according to claim 1, including a playback head and means for adjusting the playback head to the same discrete angular positions as provided for the recording head.

4. A magnetic recorder comprising a movable magnetic medium, a plurality of recording heads for the magnetic medium each of which heads is mounted at a different discrete angle with respect to the other heads and with respect to the path of movement of the magnetic medium, means for moving the magnetic medium past the heads, a respective signal input source for each head operable to enter a discrete signal upon the magnetic medium and in superimposed relation to a plurality of signals entered by the remainder of said heads.

5. A magnetic recorder comprising a movable magnetic medium, a plurality of recording heads for the magnetic medium each of which heads is mounted at a discrete angle with respect to the path of movement of the magnetic medium, means for moving the magnetic medium past the heads, a respective signal input source for each head operable to enter a discrete signal upon the magnetic medium and in superimposed relation to a plurality of signals entered by the remainder of said heads, a playback head mounted for angular movement relative to the path of movement of the magnetic medium, and means far adjusting the playback head to discrete angular positions corresponding to the angular positions of the recording heads.

6. A magnetic recorder comprising a movable magnetic medium, a plurality of recording heads each mounted at a discrete angle with respect to the path of movement of the magnetic medium, an information input device comprising a respective connection to each recording head, and an index pulse input means operable to control the input device for parallel operation of the recording heads.

7. A magnetic recorder according to claim 6 including a connection between the index pulse input means and one of the recording heads whereby the later enters a representation of the index pulse on the magnetic medium.

8. A magnetic recorder according to claim 6 in which the signal recorded on the magnetic medium by one recording head is superimposed upon a portion of a signal recorded by another recording head.

9. A magnetic recorder according to claim 6 in which the recording heads are also operable as playback heads, a single output line connected to the respective output leads from the playback heads, and a rectifier in each output lead.

10. A magnetic recorder according to claim 6 in which one of the recording heads is operable to record index pulses and in which the recording heads are also operable as playback heads; an information utilization circuit, an output lead from each playback head including a rectifier, a common output line connected between the rectifiers and the utilization circuit, and an output lead from the index pulse playback head operable in response to the index pulses to control the operation of said circuit.

11. A magnetic recorder comprising a moving magnetic medium, a recording head, means for moving the magnetic medium repeatedly past the recording head, control mechanism operable to cause the head to record each of a plurality of signals below saturation on said magnetic medium, and means for moving the head to different discrete recording positions relative the path of movement of the magnetic medium whereby a plurality of signals are recorded on the magnetic medium in partially superimposed relation to each other.

12. The combination of: a magnetic recording medium, means for recording a first signal on a discrete track of said medium, and means for superimposing a plurality of other discrete signals each upon a portion of said first signal, said other signals each being recorded at a different angular displacement relative to said first signal and to each other on said track.

References Cited in the file of this patent

UNITED STATES PATENTS

| | | |
|---|---|---|
| 699,630 | Pedersen | May 6, 1902 |
| 2,496,047 | Goddard | Jan. 31, 1950 |
| 2,697,755 | Friend | Dec. 21, 1954 |
| 2,712,572 | Roberts | July 5, 1955 |
| 2,803,988 | Ranger | Aug. 27, 1957 |
| 2,843,676 | Halliday | July 15, 1958 |
| 2,929,670 | Garrity | Mar. 22, 1960 |

FOREIGN PATENTS

| | | |
|---|---|---|
| 174,220 | Austria | Mar. 10, 1953 |
| 734,101 | Great Britain | July 27, 1955 |